United States Patent [19]

McBride

[11] 4,266,364
[45] May 12, 1981

[54] HUMANE TRAP DEVICE

[76] Inventor: Roy T. McBride, Box 725, Alpine, Tex. 79830

[21] Appl. No.: 66,032

[22] Filed: Aug. 13, 1979

[51] Int. Cl.³ ............................................. A01M 23/26
[52] U.S. Cl. ........................................................ 43/90
[58] Field of Search ........................... 43/90, 91, 88, 58

[56] References Cited

U.S. PATENT DOCUMENTS

| | | | |
|---|---|---|---|
| 1,553,389 | 9/1925 | Mulholland | 43/90 X |
| 1,600,145 | 9/1926 | Stadler | 43/90 X |
| 1,825,193 | 9/1931 | Maddox | 43/90 |
| 1,890,377 | 12/1932 | Gibbs | 43/88 |
| 2,146,464 | 2/1939 | Briddell | 43/90 |
| 3,939,596 | 2/1976 | Webley | 43/90 |
| 4,184,282 | 1/1980 | Lifshutz | 43/90 |

FOREIGN PATENT DOCUMENTS 26511 of 1897 United Kingdom ........................ 43/90

*Primary Examiner*—Nicholas P. Godici
*Attorney, Agent, or Firm*—Marcus L. Bates

[57] ABSTRACT

Apparatus by which a steel leg-hold trap is rendered humane so that the trapped animal is recovered alive and uninjured. A resilient material, such as vulcanized rubber, is removably affixed to the opposed jaws of the trap so that the animal's leg is uninjured when the jaws are closed thereon. The first reaction of any animal caught in the leg-hold trap is to bite and chew on the trap. A nipple extends from the resilient material and contains a substance, such as a tranquilizer, which subdues the animal when the substance is orally ingested. The nipple is a hollow chamber which extends away from the trap jaws so that the animal, when trapped, inherently attacks and bites the nipple, whereupon the chemical substance is released from the chamber and enters the oral cavity of the animal, causing the animal to become subdued. A tranquilizer is preferably placed within the nipple so that should the incorrect animal be trapped, he can subsequently be released unharmed.

5 Claims, 7 Drawing Figures

U.S. Patent    May 12, 1981    4,266,364
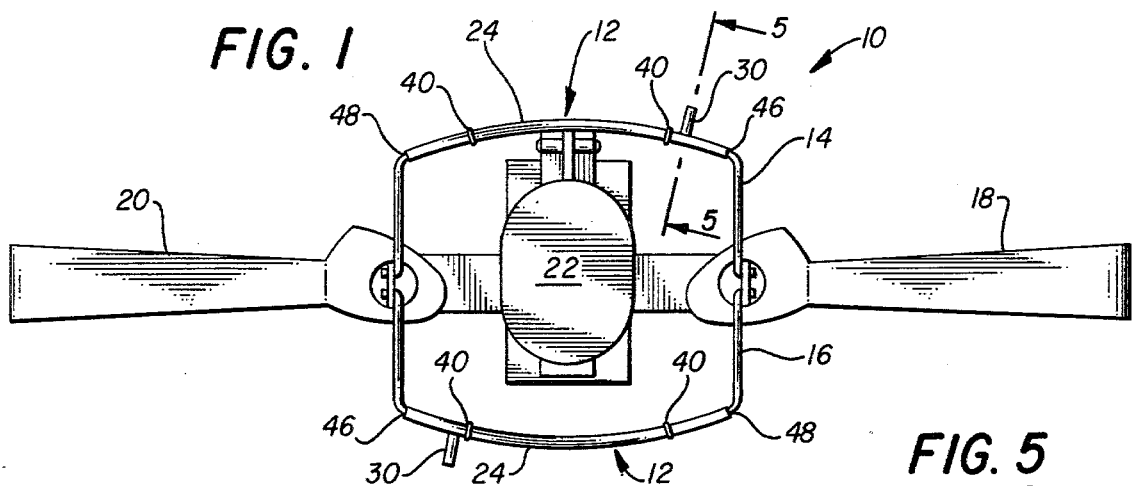
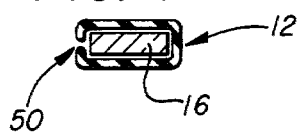
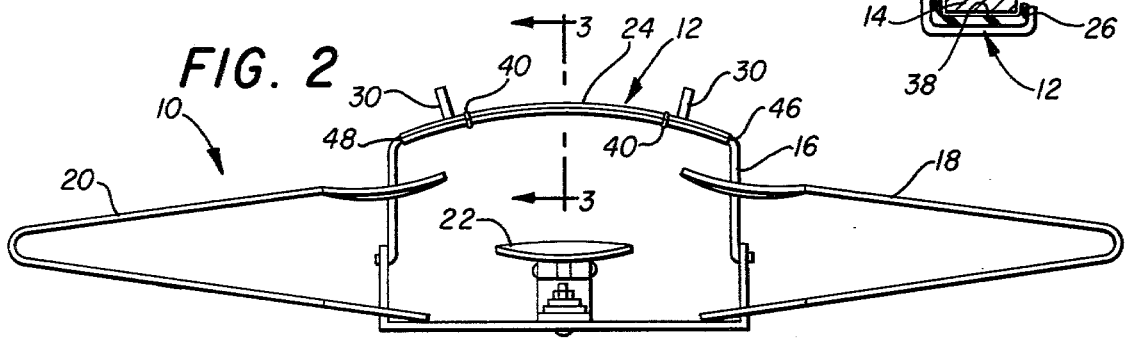
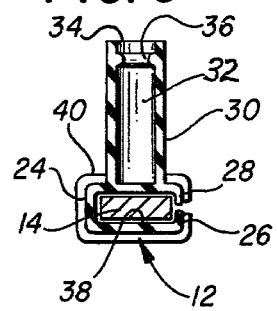
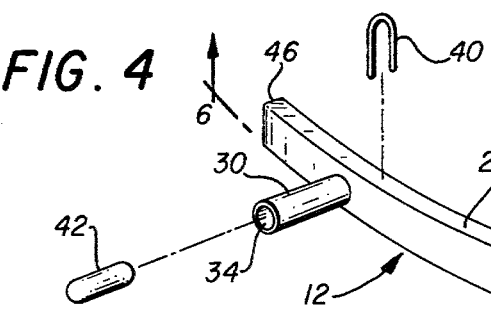
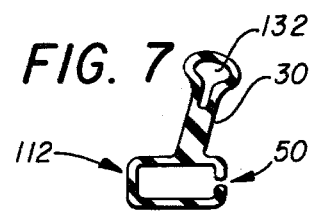
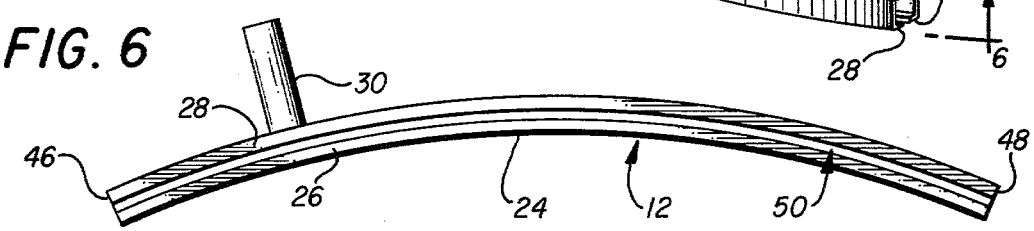

HUMANE TRAP DEVICE

BACKGROUND OF THE INVENTION

Webley, U.S. Pat. No. 3,939,596, teaches an animal trap having a pair of jaws which are covered with rubber material. The rubber material is in the form of an elongated cylinder which completely encapsulates each of the jaws, and the jaws must be disassembled in order to incorporate the tubular rubber member.

Maddox, U.S. Pat. No. 1,825,193; Kuehl, U.S. Pat. No. 4,033,067; Briddell, U.S. Pat. No. 2,146,464; and O'Neil, U.S. Pat. No. 2,316,970, show other means by which the confronting jaws of an animal trap are provided with yieldable material to grip the animal without crushing the bones.

Stratler, U.S. Pat. No. 1,600,145, discloses an animal trap having a valve and needle for injecting a substance into the body of an animal. Mulholland et al, U.S. Pat. No. 1,553,389, injects a poisonous fluid into the animal's leg to cause death. Reynolds, U.S. Pat. No. 329,082, discloses a cartridge which is fired to kill the animal when the trap is sprung.

There is a critical need for animals to be selectively trapped, inspected, and subsequently released unharmed. A steel leg trap is very efficient for trapping animals, but the confronting jaws of the trap invariably injure the animal. The animal is determined to escape the trap, and he will invariably do so even if it causes severe pain. Padding of the confronting jaws usually enables the animal to escape the trap. Injection of the animal with tranquilizers is effective when the injection occurs immediately upon entrapment of the animal.

Accordingly, it would be desirable to be able to trap animals in such a way that they are unharmed and not subject to cruel or inhumane treatment and released unharmed, if desired. This is the subject of the present invention.

SUMMARY OF THE INVENTION

The present invention relates to apparatus by which steel leg-hold traps are rendered humane. An attachment means secures a chamber to the trap structure. The attachment means preferably is a resilient covering which is placed about the confronting jaws of the steel trap. A protuberance, such as a nipple, extends from the resilient covering and presents itself to the animal in proximity to the area of the trap which captures the animal's leg. The nipple includes a chamber which is filled with a substance, such as a tranquilizer, for subduing the animal.

When the animal is captured between the trap jaws, his natural instinct is to immediately bite the object causing his distress. As the animal's teeth grasp the nipple, the subduing substance contained therewithin is orally ingested, thereby rendering the animal immobile, yet unharmed.

Various different chemicals can be used herein, including Vesprin, Tranvet and Tranimul, which are tranquilizers and are effective for approximately twenty-four hours. Hence, the animal is rendered subdued or immobile before any damage can occur to his leg, and the trapper is provided with ample time in which to inspect the trap, remove the animal therefrom, and return the animal's freedom, if desired.

The apparatus of the present invention preferably can be retrofitted to any number of different types of traps. The attachment means of the apparatus comprises an elongated, resilient hollow member having a longitudinally extending slot, so that the hollow member outwardly opens and accordingly can receive a marginal length of a trap jaw therewithin. The resilient member is affixed to the jaw with the tubular nipple extending therefrom. The nipple is hollow and can be filled with a frangible cartridge containing a tranquilizer; or alternatively, the nipple can be filled with powdered material which is easily transferred into the oral cavity of the animal when the nipple is initially attacked by the animal.

Accordingly, a primary object of the present invention is the provision of apparatus by which a steel leg-hold trap is rendered humane.

Another object of the invention is to provide a method and apparatus for temporarily subduing an animal captured within a steel leg-hold trap.

A further object of this invention is the provision of a cushion for attachment to the confronting jaws of a steel leg-hold trap which prevents injury to the animal's leg, and which furthermore includes a nipple extending therefrom which can be filled with a substance which subdues an animal.

A still further object of this invention is the provision of an apparatus which is attachable to the confronting jaws of a steel leg-hold trap so that when an animal's leg is captured therebetween, the natural instinct of the animal causes him to bite a protuberance of the apparatus, causing a tranquilizer to be ingested and the animal rendered unconscious.

These and various other objects and advantages of the invention will become readily apparent to those skilled in the art upon reading the following detailed description and claims and by referring to the accompanying drawings.

The above objects are attained in accordance with the present invention by the provision of a method which is carried out by the use of apparatus fabricated in a manner substantially as described in the above abstract and summary.

BRIEF DESCRIPTION OF THE DRAWINGS

FIG. 1 is a top plan view of a steel leg-hold trap in combination with an adapter apparatus made in accordance with the present invention;

FIG. 2 is a side elevational view of the combination disclosed in FIG. 1;

FIG. 3 is a cross-sectional view taken along line 3—3 of FIG. 2;

FIG. 4 is an enlarged, perspective view of the adapter apparatus disclosed in the foregoing figures;

FIG. 5 is a cross-sectional view taken along line 5—5 of FIG. 1;

FIG. 6 is another view of the apparatus disclosed in FIG. 4, looking in the direction indicated by the arrows at numeral 6; and, FIG. 7 is a cross-sectional view of an alternate embodiment of the present invention.

DETAILED DESCRIPTION OF THE PREFERRED EMBODIMENTS

In FIG. 1 there is disclosed an animal trap having coacting, opposed, U-shaped jaws journaled to a base for pivotal movement towards and away from one another for trapping animals therebetween, in combination with an attachment means by which a trapped animal is rendered subdued. The attachment means 12 is affixed to a marginal medial portion of the confronting jaws 14 and 16. The confronting jaws are jounaled to the base of the trap in the usual manner and include the usual leaf springs 18 and 20, which bias the jaws toward one another when a pan 22 is actuated and triggers the trap.

As seen in various ones of the figures of the drawings, the attachment means includes an elongated tubular body 24 which is discontinuous in that it is interrupted by longitudinally extending edges 26 and 28 which form an opening into the interior thereof.

A chamber or nipple 30 in the form of a cylindrical, resilient tube has one end thereof affixed to a marginal, medial portion of the hollow tubular body. The nipple is hollow, as indicated by the numeral 32, and includes a free or terminal end portion 34. A circumferentially extending shoulder 36 inwardly extends from the sidewall of the nipple and forms a resilient stop means against which a cartridge or frangible container 42 can be abuttingly received, thereby removably capturing the container 42 therewithin.

The attachment means preferably is removably affixed to each of the confronting jaws by means of the illustrated, C-shaped, deformable metal keepers 40. The wire keepers are similar to the keepers commonly used to attach seat covers to automotive-type seats. A special pair of pliers can be employed, or alternatively, an ordinary pair of pliers can be used to deform the free, opposed ends of the keepers towards one another so as to firmly attach the tubular body of the attachment means to each of the jaws, as indicated in FIGS. 1, 4, and 5.

As particularly seen illustrated in FIGS. 4 and 6, the attachment means includes the before mentioned tubular body having opposed ends 46 and 48 which preferably extend across the medial portion of one of the confronting jaws. The slot 50 extends from one end 46 to the other end 48 of the tubular body.

The apparatus of the present invention is easily installed onto almost any prior art steel leg-hold trap by merely placing a medial portion of the jaw within the interior 38 of the tubular body in the illustrated manner of FIGS. 3 and 5. The keepers 40 are next positioned at spaced locations along the body and clamped into the illustrated position seen in FIGS. 1 and 2. The frangible tubular cartridge or capsule 42 is next forced into the interior 32 of the hollow chamber 30. The shoulders 36 prevent inadvertent release of the capsule 42.

The trap is set in the usual manner and when an animal places a leg on the pan 22, the jaws pivot towards one another and capture the leg. This causes the animal to instinctively bite whatever he thinks is the cause of his discomfort. Invariably the animal bites one of the nipples 30, causes the subduing substance contained therewithin to be orally ingested, whereupon the animal is subdued for a length of time, depending upon the dosage and physiological characteristics of the subduing substance.

As seen in FIG. 7, the nipple 30 can be made into an enclosed cavity 132 so that a hypodermic needle can be used to transfer a subduing substance into the interior 132 of the nipple.

In the embodiments of FIGS. 1-6, powder subduing substance can also be stored in the cavity 32. In this instance, it is sometimes advisable to stopper the end 34 to prevent inadvertent loss of the subduing substance.

When an animal is trapped by the method of the present invention, the resilient material about the jaws prevents immediate harm to the animal's leg. The animal will be subdued long before he can bite his leg or before the confronting jaws can cause any substantial injury to his extremity. The animal remains in a tranquilized state until the trapper makes his daily inspection; and accordingly, the tranquilizer is selected with this time interval in mind.

This enables all trapped animals, whether intentionally or accidentally caught, to be identified and retained or released, if desired.

Furthermore, the practice of the present invention of using a tranquilizer in conjunction with a prior art leg-hold trap enables various unique objectives to be accomplished which were heretofore difficult or impossible. For example, a biologist wishing to study animal behavior using radio telemetry can capture an animal without injury thereto. Animal damage control trappers can release accidentally caught, nontarget species. Animals taken for laboratory tests are received in optimum condition. By the present invention, any animal caught in a leg-hold trap, regardless of the purpose, will be held in a humane and tranquilized state, thereby obviating injury and suffering.

I claim:

1. In an animal trap having coacting, opposed, U-shaped jaws journaled to a base for pivotal movement towards and away from one another for trapping an animal therebetween, the combination of said trap and an attachment means by which a trapped animal is rendered subdued;

said attachment means includes a body, means attaching said body to one of said jaws;

a resilient member affixed to said body and extending away from the jaw; said resilient member having a chamber formed therewithin, within which a substance for subduing animals can be stored;

whereby, a substance for subduing animals can be placed within said chamber, so that when an animal is caught in the trap, and the trapped animal bites the resilient member, the substance stored within the chamber is ingested by the animal, thereby subduing the animal.

2. The combination of claim 1 wherein said body is in the form of an elongated, tubular body which encapsulates a medial length of one of the U-shaped jaws;

said resilient member is a hollow nipple having one end affixed to said elongated tubular body and another end which extends away therefrom; said chamber is formed within the end of the hollow nipple which is opposed to the elongated tubular body so that a substance for subduing animals is encapsulated within the chamber.

3. The combination of claim 1 wherein said body of said attachment means is elongated, hollow, resilient, tubular member having opposed ends, and a longitudinally extending slot is formed along a wall thereof which outwardly opens from the interior thereof;

one of the jaws of the trap being received within the interior of said tubular member.

4. The combination of claim 3 wherein said chamber is in the form of an outwardly opening hollow cylinder having one end thereof affixed to said tubular member and a free end thereof extending therefrom.

5. The combination of claim 1 wherein said attachment means is an elongated, hollow, resilient, tubular body having opposed ends, and a longitudinally extending slot formed along a wall thereof which outwardly opens from the interior thereof;

said resilient member has one end thereof affixed to said tubular body and a free end extending therefrom; said chamber is closed so that the substance for subduing animals is encapsulated therewithin.

* * * * *